United States Patent
Pan

(10) Patent No.: US 11,482,940 B2
(45) Date of Patent: Oct. 25, 2022

(54) HIGH-EFFICIENCY LLC RESONANT CONVERTER

(71) Applicant: CHANNEL WELL TECHNOLOGY CO., LTD., Taoyuan (TW)

(72) Inventor: Yi-An Pan, Taoyuan (TW)

(73) Assignee: CHANNEL WELL TECHNOLOGY CO., LTD., Taoyuan (TW)

( * ) Notice: Subject to any disclaimer, the term of this patent is extended or adjusted under 35 U.S.C. 154(b) by 75 days.

(21) Appl. No.: 17/152,905

(22) Filed: Jan. 20, 2021

(65) Prior Publication Data

US 2022/0069722 A1  Mar. 3, 2022

(30) Foreign Application Priority Data

Sep. 2, 2020  (TW) ................. 109129982

(51) Int. Cl.
  *H02M 3/335*  (2006.01)
  *H02M 1/08*   (2006.01)
  *H02M 1/00*   (2006.01)
  *H02M 3/00*   (2006.01)
  H02M 1/42    (2007.01)

(52) U.S. Cl.
  CPC ....... *H02M 3/33592* (2013.01); *H02M 1/007* (2021.05); *H02M 1/08* (2013.01); *H02M 3/01* (2021.05); *H02M 1/4208* (2013.01)

(58) Field of Classification Search
  CPC .... H02M 3/33592; H02M 1/007; H02M 1/08; H02M 1/0009; H02M 1/4208; H02M 1/4225; H02M 3/01
  See application file for complete search history.

(56) References Cited

U.S. PATENT DOCUMENTS

| 2011/0085354 A1* | 4/2011 | Wang | H02M 1/4225 363/21.02 |
| 2013/0148384 A1* | 6/2013 | Kim | H02M 1/4225 363/21.02 |
| 2014/0268905 A1* | 9/2014 | Reddy | H02M 1/4225 363/21.02 |

FOREIGN PATENT DOCUMENTS

CN  107294407 A  * 10/2017

* cited by examiner

*Primary Examiner* — Kyle J Moody
*Assistant Examiner* — Jye-June Lee

(57) ABSTRACT

A high-efficiency LLC resonant converter is disclosed. During a normal operation of the LLC resonant converter, an error amplifier unit generates a modulated voltage signal to a first control unit after receives a data of voltage difference from a detection unit, and then the first control unit calculates an immediate load rate based on the modulated voltage signal. Subsequently, the second control unit receives a first adjustment signal that is outputted by the first control unit, so as to correspondingly generate a switch element controlling signal to a switch element of a DC power supplying unit of the LLC resonant converter, thereby achieving an output voltage modulation of the DC power supplying unit. As such, the LLC resonant converter is controlled to exhibit a conversion efficiency of at least 98% in case of working at any one load state.

20 Claims, 7 Drawing Sheets

HIGH-EFFICIENCY LLC RESONANT CONVERTER

BACKGROUND OF THE INVENTION

1. Field of the Invention

The present invention relates to the technology field of switching-mode power supply (SMPS), and more particularly to a high-efficiency LLC resonant converter.

2. Description of the Prior Art

Switching-mode power supply devices have been widely applied in electronic products and electrical apparatuses. As miniaturization and light weight are the prevailing trend for design of an electronic product, a higher power density is required on SMPS device. Hence it is a greater challenge for SMPS device to exhibit higher conversion efficiency and large power density with a small device volume. Accordingly, LLC resonant converter is developed and proposed. The switching loss of the LLC resonant converter becomes very small because when either voltage or current is zero when it is switch on or off Switching at zero-voltage crossing is called zero-voltage switching (ZVS) whereas switching at zero-current crossing is called zero-current switching (ZCS).

FIG. 1 shows a diagram for describing a circuit topology of a conventional LLC resonant converter. A conventional LLC resonant converter 2' commonly comprises: a full bridge rectifier unit 21', a power factor correction (PFC) unit 22' containing a first switch element SQ1', a bridge switch unit consisting of a second switch element SQ2' and a third switch element SQ3', a resonant unit 24', a transformer unit 25', an output rectifying unit 26', a current detecting resistor Rs', a voltage detecting unit consisting of a first divider resistance Rv1' and a second divider resistance Rv2', an error amplifier unit 27', an isolation feedback unit 28', and a control unit 29'. From FIG. 1, it is known that the resonant unit 24' consists of a resonance inductor Lr' and a resonance capacitor Cr', and the transformer unit 25' has a magnetizing inductor Lm' that is form an LLC resonant tank in combination with the resonance inductor Lr' and the resonance capacitor Cr'.

During a normal operation, changing a switching frequency ($f_S$) of the second switch element SQ2' and the third switch element SQ3' is able to modulate the gain of the LLC resonant converter 2', thereby achieving well control and adjustment of an output voltage of the LLC resonant converter 2'. In other words, it needs to let a modulating range of the switching frequency ($f_S$) be correspondingly widen in response to the output voltage that can be adjusted in a broad range. As a result, it is necessary for the LLC resonant converter 2' to be applied with a proper hardware upgrade, so as to make a ratio of the switching frequency ($f_S$) and a resonant frequency (fr) of the LLC resonant tank be well controlled to approach 1 (i.e., $f_S$=fr).

However, as far as a fabrication of the LLC resonant converter 2', the resonant frequency (fr) is fixed to be a constant after the LLC resonant tank is made according a pre-designed hardware specification. That is, it is impossible to apply an in-line modulation to the resonant frequency (fr) of the LLC resonant tank in response to an immediate load rate of the LLC resonant converter 2'. In such case, it's the only thing to modulate the switching frequency ($f_S$) for stabilizing the output voltage of the LLC resonant converter 2' as much as possible. For example, in case of a load state of the LLC resonant converter 2' varies from a no load state or a light load state to a full load state, a value of the switching frequency ($f_S$) must be changed drastically and fast for stabilizing the output voltage of the LLC resonant converter 2' as much as possible. However, in a real case, it is impossible to directly modulate the switching frequency ($f_S$) to be approach the resonant frequency (fr) of the LLC resonant tank during a fast change of the load rate of the LLC resonant converter 2', thereby resulting in a large reduction of a conversion efficiency of the LLC resonant converter 2'.

FIG. 1 depicts that the conventional LLC resonant converter 2' has a control unit 29', and a conventional way to fast change the value of the switching frequency ($f_S$) is modulating at least one compensation parameter of the control unit 29'. However, such way is found to cause the switching frequency ($f_S$) of the LLC resonant converter 2' be not equal to resonant frequency (fr). FIG. 1 also depicts that the conventional LLC resonant converter 2' further has a PFC unit 22'. As FIG. 1 shows, an output voltage of the PFC unit 22' can be modulated by transmitting a switch element controlling signal to a first switch element SQ1', such that the PFC unit 22' is configured to attenuate harmonic parts of a pulsating DC signal that is outputted from the bridge rectifier 21'.

FIG. 2 illustrates a curve graph of load rate versus conversion efficiency of the conventional LLC resonant converter 2' having the PFC unit 22'. In the curve graph, data of curve A is measured as a 115 Vac power signal is inputted to the LLC resonant converter 2', and data of curve B is measured as the bridge rectifier 21' of the LLC resonant converter 2' is coupled with a 230 Vac power signal. From the measured data, it is understood that, letting the LLC resonant converter 2' be further integrated with the PFC unit 22' is apparently helpful in enhancing the conversion efficiency of the LLC resonant converter 2'. Moreover, according to FIG. 2, it is also known that, the LLC resonant converter 2' exhibits a maximum conversion efficiency of 95% while being operated at 50% load rate. However, it is worth noting that, the conversion efficiency shows an abrupt reduction in case of the LLC resonant converter 2' being operated at the light load state or the heavy load state, From above descriptions, it is clear that there is still room for improvement in the conventional LLC resonant converter. In view of that, inventors of the present application have made great efforts to make inventive research and eventually provided a high-efficiency LLC resonant converter.

SUMMARY OF THE INVENTION

The primary objective of the present invention is to disclose a high-efficiency LLC resonant converter, comprising: a DC power supplying unit, a bridge switch unit, a resonant unit, a transformer unit, an output rectifying unit, a detection unit, a first control unit, an error amplifier unit, a first isolation feedback unit, and a second control unit. According to the present invention, the error amplifier unit receives a voltage difference from the two terminal ends of the detection unit so as to correspondingly generate a modulated voltage signal to the first control unit, thereby making the first control unit acquire an immediate load rate of the LLC resonant converter. Subsequently, the second control unit receives a first adjustment signal that is outputted by the first control unit via the first isolation feedback unit, so as to correspondingly generate a switch element controlling signal to a switch element of the DC power supplying unit, thereby achieving an output voltage modulation of the DC power supplying unit. As such, the LLC resonant converter is controlled to exhibit a conversion efficiency of at least 98% in case of working at any one load state.

In order to achieve the primary objective of the present invention, inventors of the present invention provides a first embodiment for the high-efficiency LLC resonant converter, comprising:

a DC power supplying unit, having at least one first switch element, and being configured for receiving a power signal, thereby outputting a first voltage signal after applying a power conversion process to the power signal;

a bridge switch unit, being coupled to the DC power supplying unit for receiving the first voltage signal;

a resonant unit, comprising a resonant inductor and a resonant capacitor, and being coupled to a second voltage signal that is transmitted from the bridge switch unit;

a transformer unit, comprising a primary winding, a magnetizing inductor that is parallelly connected to the primary winding, and a secondary winding having a first electrical terminal, a second electrical terminal and a third electrical terminal, wherein the primary winding is coupled to the resonant unit, such that the magnetizing inductor, the resonant inductor and the resonant capacitor together form an LLC resonant tank;

an output rectifying unit, being coupled to the first electrical terminal and the third electrical terminal of the secondary winding, thereby outputting an output voltage signal to at least one load device after applying a signal rectifying process to a third voltage signal received from the secondary winding;

a detection unit, being coupled to the second electrical terminal of the secondary winding, and having two end terminals;

a first control unit, being coupled to the output rectifying unit;

an error amplifier unit, being coupled to the two end terminals of the detection unit, and being also coupled to the first control unit; wherein the error amplifier unit receives a voltage difference from the two terminal ends of the detection unit, so as to correspondingly generate a modulated voltage signal to the first control unit, such that the first control unit generates a first adjustment signal after calculating an immediate load rate based on the modulated voltage signal;

a first isolation feedback unit, being coupled to the first control unit; and a second control unit, being coupled to the first isolation feedback unit, and being also coupled to first adjustment signal via the first isolation feedback unit, so as to correspondingly generate a first switch element controlling signal transmitted to a control signal receiving terminal of the switch element of the DC power supplying unit, such that an output voltage modulation of the DC power supplying unit is achieved, thereby keeping a conversion efficiency of the LLC resonant converter be greater than a specific value.

Moreover, for achieving the primary objective of the present invention, inventors of the present invention provides a second embodiment for the high-efficiency LLC resonant converter, comprising:

a DC power supplying unit, having at least one first switch element, and being configured for receiving a power signal, thereby outputting a first voltage signal after applying a power conversion process to the power signal;

a bridge switch unit, being coupled to the DC power supplying unit for receiving the first voltage signal;

a resonant unit, comprising a resonant inductor and a resonant capacitor, and being coupled to a second voltage signal that is transmitted from the bridge switch unit;

a transformer unit, comprising a primary winding, a magnetizing inductor that is parallelly connected to the primary winding, and a secondary winding having a first electrical terminal, a second electrical terminal and a third electrical terminal, wherein the primary winding is coupled to the resonant unit, such that the magnetizing inductor, the resonant inductor and the resonant capacitor together form an LLC resonant tank;

an output rectifying unit, being coupled to the first electrical terminal and the third electrical terminal of the secondary winding, thereby outputting an output voltage signal to at least one load device after applying a signal rectifying process to a third voltage signal received from the secondary winding;

a detection unit, being coupled to the second electrical terminal of the secondary winding, and having two end terminals;

a first control unit, being coupled to the output rectifying unit;

an error amplifier unit, being coupled to the two end terminals of the detection unit, so as to correspondingly generate a modulated voltage signal after receiving a voltage difference from two terminal ends of the detection unit;

a first isolation feedback unit, being coupled to the error amplifier unit; and a second control unit, being coupled to the first isolation feedback unit, and being also coupled to the modulated voltage signal Sm via the first isolation feedback unit;

wherein the second control unit calculates an immediate load rate based on the modulated voltage signal, and correspondingly generating a first switch element controlling signal, based on the calculated immediate load rate, transmitted to a control signal receiving terminal of the switch element of the DC power supplying unit, such that an output voltage modulation of the DC power supplying unit is achieved by using the first switch element controlling signal to control a switching frequency of the first switch element, thereby keeping a conversion efficiency of the LLC resonant converter be greater than a specific value.

In the first embodiment and the second embodiment of the high-efficiency LLC resonant converter, the DC power supplying unit is an AC-to-DC power converter or a DC-to-DC converter.

Moreover, in a practicable embodiment, the forgoing DC power supplying unit is a DC-to-DC converter, and comprises:

a full-bridge rectifying unit, being coupled to the power signal, so as to convert the power signal to a pulsating DC signal; and a PFC unit comprising the at least one first switch element, being coupled to the full-bridge rectifying unit.

In the first embodiment and the second embodiment of the high-efficiency LLC resonant converter, the PFC unit is selected from the group consisting of semi-bridgeless PFC unit, interleaving PFC unit, totem pole PFC, and regular PFC unit.

In the first embodiment and the second embodiment of the high-efficiency LLC resonant converter, the bridge switch unit is selected from the group consisting of full-bridge switch unit and half-bridge switch.

Moreover, in a practicable embodiment, the bridge switch unit is a half-bridge switch, and comprises:

a second switch element having a first electrical terminal, a second electrical terminal and a control signal receiving terminal, and being coupled to the PFC unit and the resonant unit by the first electrical terminal and the second electrical terminal thereof; and a third switch element having a first electrical terminal, a second electrical terminal and a control signal receiving electrical terminal, and being coupled to the PFC unit of the DC power supplying unit and the resonant unit by the second electrical terminal and the first electrical terminal thereof.

In the first embodiment and the second embodiment of the high-efficiency LLC resonant converter, the output rectifying unit is a synchronous rectifier (SR) unit, and comprises:

a fourth switch element having a first electrical terminal, a second electrical terminal and a control signal receiving terminal, and being coupled to the first electrical terminal and the third electrical terminal of the secondary winding; and a fifth switch element having a first electrical terminal, a second electrical terminal and a control signal receiving electrical terminal, and being coupled to the third electrical terminal of the secondary winding and the load device by the first electrical terminal and the second electrical terminal thereof;

wherein the control signal receiving terminal of the fourth switch element and the control signal receiving terminal of the fifth switch element are both coupled to the first control unit.

In the first embodiment and the second embodiment of the high-efficiency LLC resonant converter, each of the first switch element, the second switch element, the third switch element, the fourth switch element, and the fifth switch element is selected from the group consisting of power MOSFET, GaN MOSFET and insulated gate bipolar transistor (IGBT).

In the first embodiment of the high-efficiency LLC resonant converter, the first control unit comprises:

a calculation unit, being configured for calculating the immediate load rate based on the modulated voltage signal; and a micro processing unit, being coupled to the calculation unit, thereby generating the first adjustment signal Smd1 based on the calculated immediate load rate.

Moreover, the first embodiment of the high-efficiency LLC resonant converter further comprises:

a voltage detection unit, being coupled the second electrical terminal of the secondary winding; and a second isolation feedback unit, being coupled to the first control unit, and being also coupled to the control signal receiving terminal of the second switch element and the control signal receiving terminal of the third switch element;

wherein the second control unit generates a second adjustment signal after acquiring a voltage signal sampling data from the voltage detection unit, such that the control signal receiving terminal of the second switch element and the control signal receiving terminal of the third switch element receive a second switch element controlling signal and a third switch element controlling signal S3 from the second isolation feedback unit.

In the second embodiment of the high-efficiency LLC resonant converter, the second control unit comprises:

a calculation unit, being configured for calculating the immediate load rate based on the modulated voltage signal; and a micro processing unit, being coupled to the calculation unit, thereby generating the first switch element controlling signal based on the calculated immediate load rate.

Moreover, the second embodiment of the high-efficiency LLC resonant converter further comprises:

a voltage detection unit, being coupled the second electrical terminal of the secondary winding; and a second isolation feedback unit, being coupled to the first control unit, and being also coupled to the control signal receiving terminal of the second switch element and the control signal receiving terminal of the third switch element;

wherein the second control unit generates an adjustment signal after acquiring a voltage signal sampling data from the voltage detection unit, such that the control signal receiving terminal of the second switch element and the control signal receiving terminal of the third switch element receive a second switch element controlling signal and a third switch element controlling signal from the second isolation feedback unit.

BRIEF DESCRIPTION OF THE DRAWINGS

The invention as well as a preferred mode of use and advantages thereof will be best understood by referring to the following detailed description of an illustrative embodiment in conjunction with the accompanying drawings, wherein.

DETAILED DESCRIPTION OF THE PREFERRED EMBODIMENTS

To more clearly describe a high-efficiency LLC resonant converter disclosed by the present invention, embodiments of the present invention will be described in detail with reference to the attached drawings hereinafter.

First Embodiment

Figure 3:
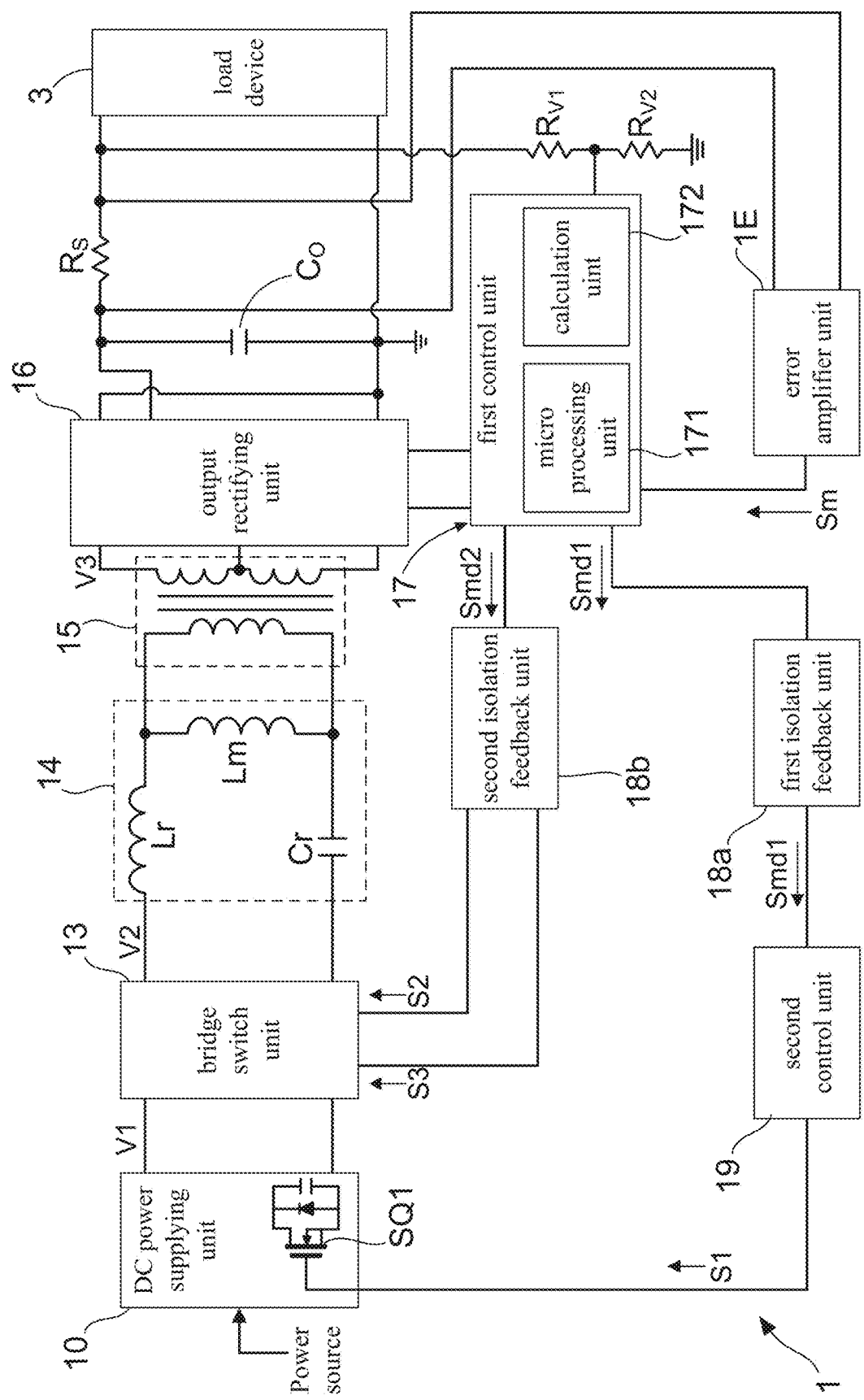
FIG. 3 shows a block diagram of a high-efficiency LLC resonant converter according to the present invention.

With reference to FIG. 3, there is shown a block diagram of a high-efficiency LLC resonant converter according to the present invention. As FIG. 3 shows, the high-efficiency LLC resonant converter 1 comprises: a DC power supplying unit 10, a bridge switch unit 13, a resonant unit 14, a transformer unit 15, an output rectifying unit 16, a detection unit Rs, a first control unit 17, an error amplifier unit 1E, a first isolation feedback unit 18a, and a second control unit 19. The DC power supplying unit 10 has at least one first switch element SQ1, and is configured for receiving a power signal, thereby outputting a first voltage signal V1 after applying a power conversion process to the power signal. In a practicable embodiment, the DC power supplying unit 10 can be an AC-to-DC power converter or a DC-to-DC converter.

Figure 4:
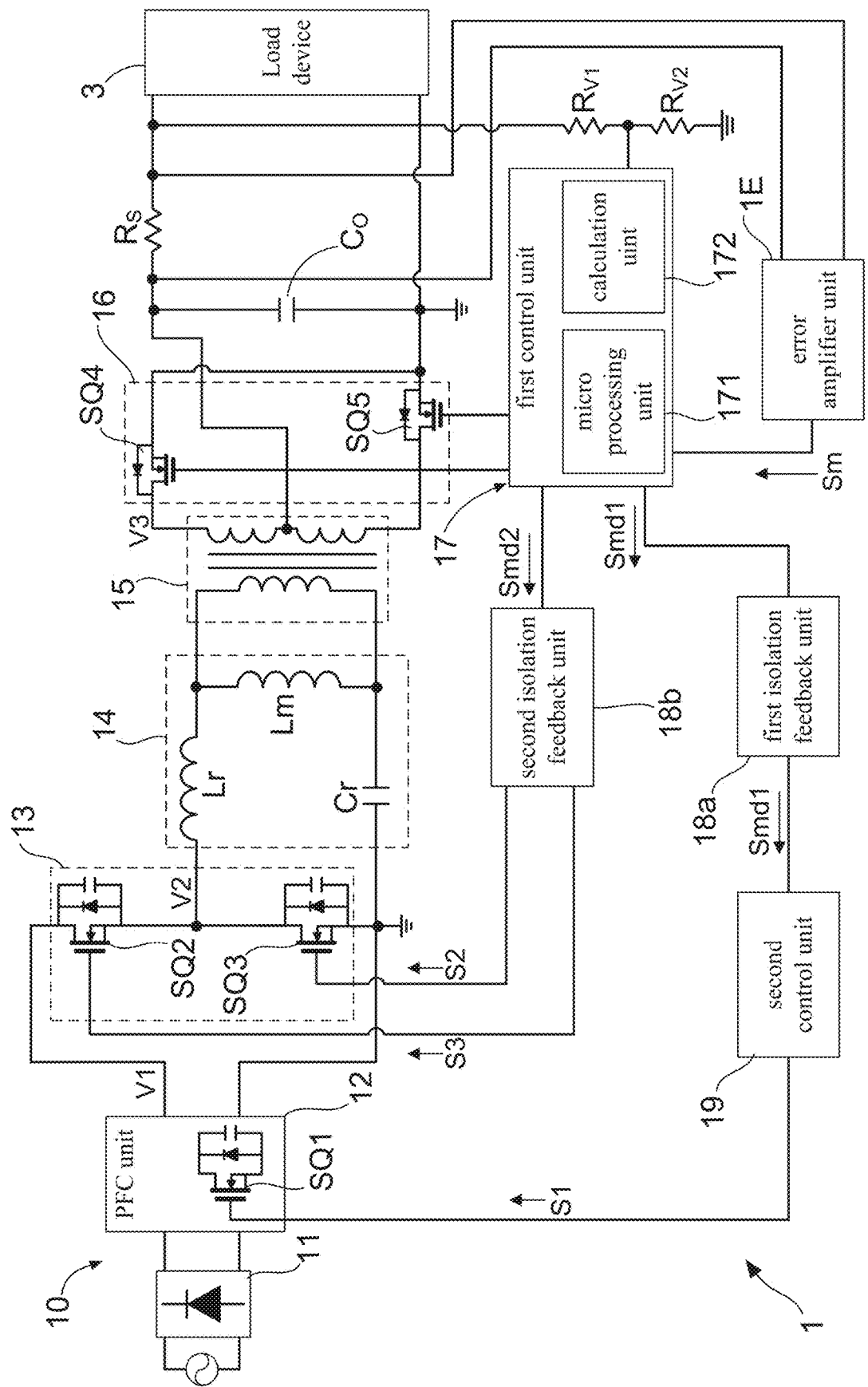
FIG. 4 shows a diagram for diagram for describing the high-efficiency LLC resonant converter according to the present invention.

Referring to FIG. 3 again, and please simultaneously refer to FIG. 4 showing a diagram for diagram for describing the high-efficiency LLC resonant converter. FIG. 4 depicts that the DC power supplying unit 10 is a boost DC-to-DC converter, and comprises a full-bridge rectifying unit 11 and a PFC unit 12. In which, the full-bridge rectifying unit 11 is coupled to the power signal, so as to convert the power signal to a pulsating DC signal $V_{IN}$. On the other hand, the PFC unit 12 comprises the first switch element SQ1, and is coupled to the full-bridge rectifying unit 11. As explained in more detail below, the pulsating DC signal $V_{IN}$ is an input voltage signal received by the PFC unit 12, and the forgoing first voltage signal V1 is an output signal of the PFC unit 12.

Herein, it needs to particularly explain that, the PFC unit 12 is not limited to be a regular PFC circuit. In a practicable embodiment, each of semi-bridgeless PFC circuit, interleaving PFC circuit, and totem pole PFC can also be adopted for be as the PFC unit 12. Moreover, from FIG. 3 and FIG. 4, it is understood that the bridge switch unit 13 is coupled to the DC power supplying unit 10 for receiving the first voltage signal V1.

Similarly, the bridge switch unit 13 is not limited to be a half-bridge circuit. In a practicable embodiment, the bridge switch unit 13 can also be designed to be a full-bridge switch circuit. Moreover, from FIG. 4, it is understood that the bridge switch unit 13 is designed to be a half-bridge switch circuit consisting of a second switch element SQ2 and a third switch element SQ3. In which, the second switch element SQ2 has a first electrical terminal, a second electrical terminal and a control signal receiving terminal, and is coupled to the PFC unit 12 of the DC power supplying unit 10 and the resonant unit 14 by the first electrical terminal and the second electrical terminal thereof. On the other hand, the third switch element SQ3 has a first electrical terminal, a second electrical terminal and a control signal receiving electrical terminal, and is coupled to the PFC unit 12 of the DC power supplying unit 10 and the resonant unit 14 by the second electrical terminal and the first electrical terminal thereof.

FIG. 3 and FIG. 4 also depict that, the resonant unit 14 comprises a resonant inductor Lr and a resonant capacitor Cr, and is coupled to a second voltage signal that is transmitted from the bridge switch unit 13. Moreover, the transformer unit 15 comprises a primary winding, a magnetizing inductor Lm that is parallelly connected to the primary winding, and a secondary winding having a first electrical terminal, a second electrical terminal and a third electrical terminal, wherein the primary winding is coupled to the resonant unit 14, such that the magnetizing inductor Lm, the resonant inductor Lr and the resonant capacitor Cr together form an LLC resonant tank.

FIG. 3 and FIG. 4 also depict that the output rectifying unit 16 is coupled to the first electrical terminal and the third electrical terminal of the secondary winding, thereby outputting an output voltage signal to at least one load device 3 after applying a signal rectifying process to a third voltage signal V3 received from the secondary winding. In a practicable embodiment, the output rectifying unit 16 is a synchronous rectifier (SR) unit, and comprises a fourth switch element SQ4 and a fifth switch element SQ5. In which, the fourth switch element SQ4 has a first electrical terminal, a second electrical terminal and a control signal receiving terminal, and is coupled to the first electrical terminal and the third electrical terminal of the secondary winding. On the other hand, the fifth switch element SQ5 has a first electrical terminal, a second electrical terminal and a control signal receiving electrical terminal, and is coupled to the third electrical terminal of the secondary winding and the load device 3 by the first electrical terminal and the second electrical terminal thereof. From FIG. 3 and FIG. 4, it is understood that, after receiving the second voltage signal V2 from the ridge switch unit 13 via the resonant unit 14, the transformer unit 15 converts the second voltage signal V2 to a third voltage signal V3. Subsequently, the output rectifying unit 16 outputs an output voltage signal to at least one load device 3 after applying a signal rectifying process to the third voltage signal V3 received from the secondary winding of the transformer unit 15.

Moreover, the detection unit Rs is coupled to the second electrical terminal of the secondary winding, and the first control unit 17 is coupled to the output rectifying unit 16. On the other hand, the error amplifier unit 1E is coupled to two end terminals of the detection unit Rs, and is also coupled to the first control unit 17. According to the particular design of the present invention, the error amplifier unit 1E receives a voltage difference from the two terminal ends of the detection unit Rs, so as to correspondingly generate a modulated voltage signal Sm to the first control unit 17, such that the first control unit 17 generates a first adjustment signal Smd1 after calculating an immediate load rate based on the modulated voltage signal Sm. FIG. 3 and FIG. 4 also depict that, the first isolation feedback unit 18a is coupled to the first control unit 17, and the second control unit 19 is coupled to the first isolation feedback unit 18a.

According to the present invention, the second control unit 19 is also coupled to first adjustment signal Smd1 via the first isolation feedback unit 18a, so as to correspondingly generate a first switch element controlling signal S1 transmitted to a control signal receiving terminal of the switch element SQ1 of the DC power supplying unit 10, such that an output voltage modulation of the DC power supplying unit 10 is achieved. In other words, after generating the first switch element controlling signal S1 based on the immediate load rate, the first switch element controlling signal S1 is transmitted to the first switch element SQ1 for modulating the switching frequency ($f_S$), so as to make a ratio of the switching frequency ($f_S$) and a resonant frequency (fr) of the LLC resonant tank be well controlled to approach 1 (i.e., $f_S$=fr), thereby controlling the LLC resonant converter 1 exhibits a conversion efficiency of at least 98%.

From FIG. 3 and FIG. 4, it is found that the first control unit 17 comprises a calculation unit 172 and a micro processing unit 171. In which, the calculation unit 172 is configured for calculating the immediate load rate based on the modulated voltage signal Sm, and the micro processing unit 171 is coupled to the calculation unit 172, so as to generate the first adjustment signal Smd1 based on the calculated immediate load rate. In one practicable embodiment, the calculation unit 172 is implemented into the first control unit 17 by a form of mathematical algorithm.

In another one practicable embodiment, the calculation unit 172 can be a Look-up table (LUT) recording with a plurality of voltage values of the modulated voltage signal Sm that is generated by the error amplifier unit 1E, a plurality of load rates that are respectively corresponding to the plurality of voltage values, and a plurality of modulation parameters that are respectively corresponding to the plurality of load rates. For example, it is able to set the modulated voltage signal Sm has a voltage value varies in a range from 0V and 2.0V. As explained in more detail below, when the LLC resonant converter 1 is operated at a no load state (i.e. load rate=0%), the voltage value of the modulated voltage signal Sm is set to be 0V. On the contrary, when the LLC resonant converter 1 is operated at a full load state (i.e. load rate=0%), the voltage value of the modulated voltage signal Sm is set to be 2.0V. As such, it should be understood that a load rate monitoring resolution of the LLC resonant converter 1 can be set to N, and N is decided by a formula of (2−0)/M. M is a voltage changing value. From example, if the voltage values of the modulated voltage signal Sm recorded in the LUT (i.e., the calculation unit 172) are 0V, 0.02V, . . . , 1V, 1.02V, . . . , 1.98V, and 2V, the forgoing voltage changing value M is 0.02. Accordingly, the plurality of load rates, respectively corresponding to the plurality of voltage values, are 1%, 2%, . . . , 50%, 51%, . . . , 99%, 100%.

Briefly speaking, during a normal operation of the LLC resonant converter 1, the error amplifier unit 1E generates a modulated voltage signal Sm to the first control unit 17 after receives a data of voltage difference from a detection unit Rs, and then the first control unit 17 calculates an immediate load rate based on the modulated voltage signal Sm. Subsequently, the second control unit 19 receives a first adjustment signal Smd that is outputted by the first control unit 17, so as to correspondingly generate a first switch element controlling signal S1 to the first switch element SQ1 of the DC power supplying unit 10, thereby achieving an output voltage modulation of the DC power supplying unit 10. As such, the LLC resonant converter 1 is controlled to exhibit a conversion efficiency of at least 98% in case of working at any one load state.

Figure 5:
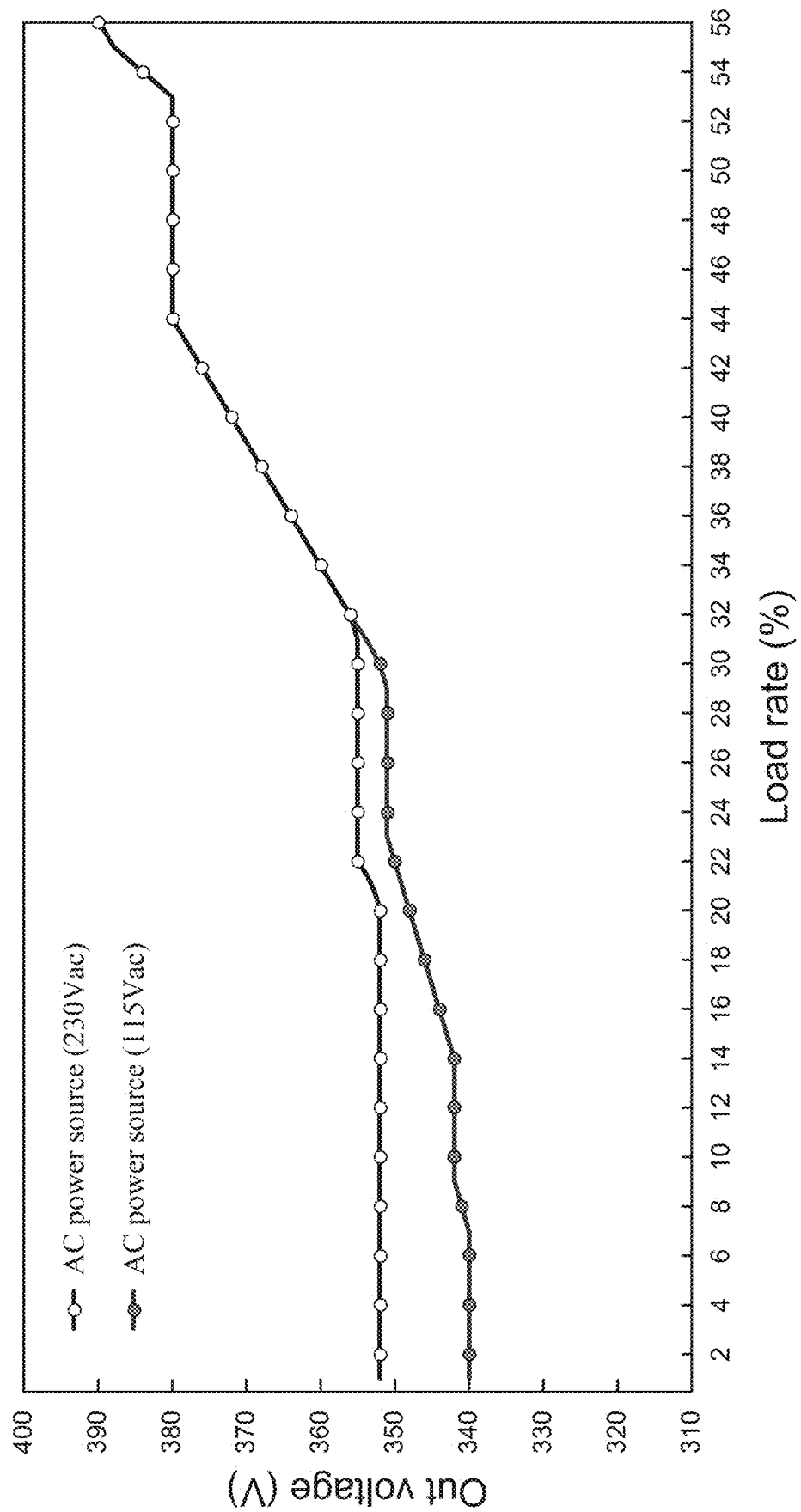
FIG. 5 shows a curve graph of load rate versus output voltage of a DC power supplying unit of the LLC resonant converter.
Figure 6:
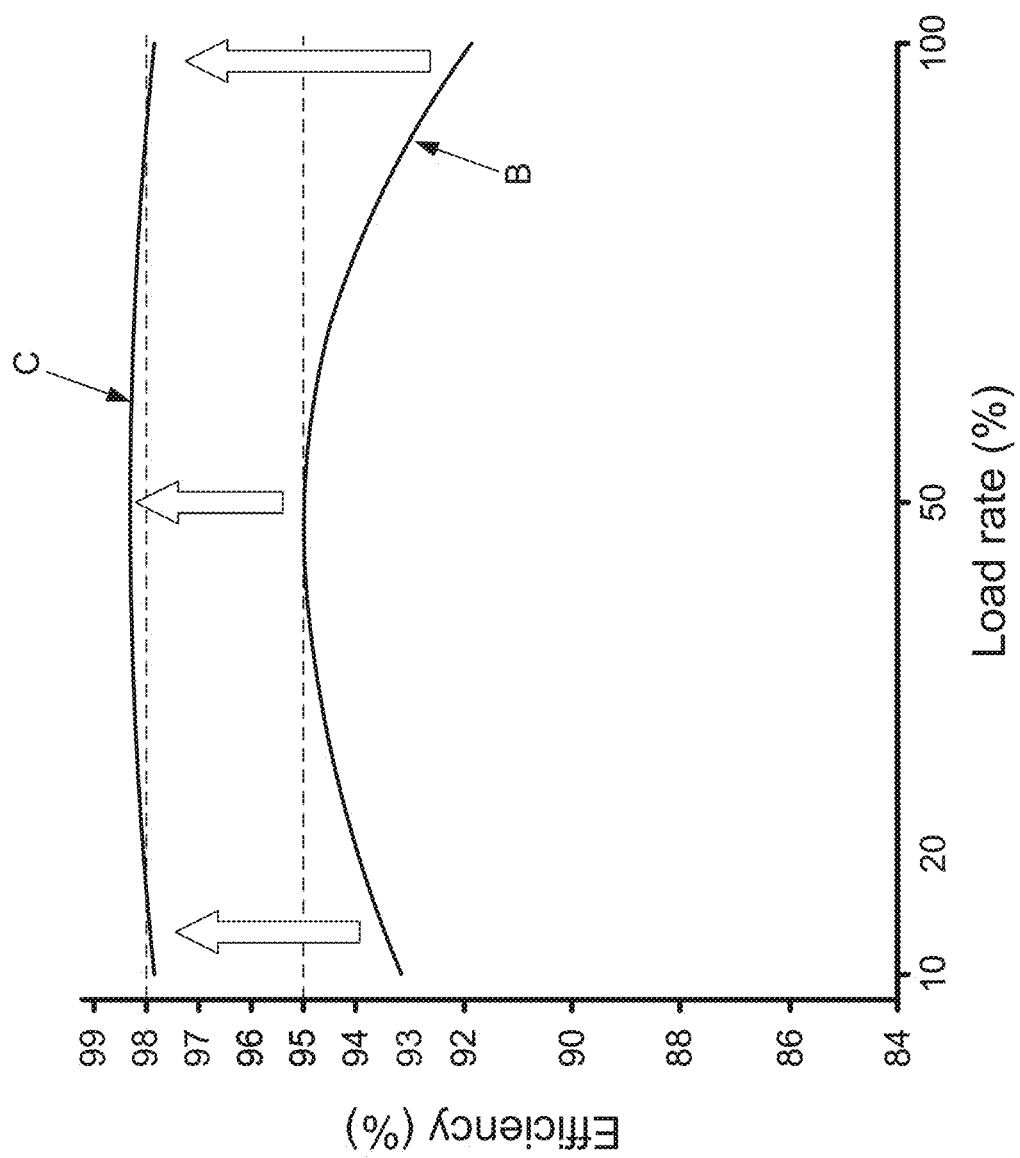
FIG. 6 shows a curve graph of load rate versus conversion efficiency of the LLC resonant converter.

FIG. 5 shows a curve graph of load rate versus output voltage of the DC power supplying unit 10 of the LLC resonant converter. In addition, FIG. 6 shows a curve graph of load rate versus conversion efficiency of the LLC resonant converter. FIG. 4 has depicted that the DC power supplying unit 10 comprises a full-bridge rectifying unit 11 and a PFC unit 12, and the PFC unit 12 comprises the first switch element SQ1 coupled to the full-bridge rectifying unit 11. As explained in more detail below, the pulsating DC signal $V_{IN}$ is an input voltage signal received by the PFC unit 12, and the forgoing first voltage signal V1 is an output signal of the PFC unit 12. In the present invention, the first control unit 17 and the second control unit 19 are configure to eventually generate a first switch element controlling signal S1 based on an immediate load rate of the LLC resonant converter 1.

Figure 1:
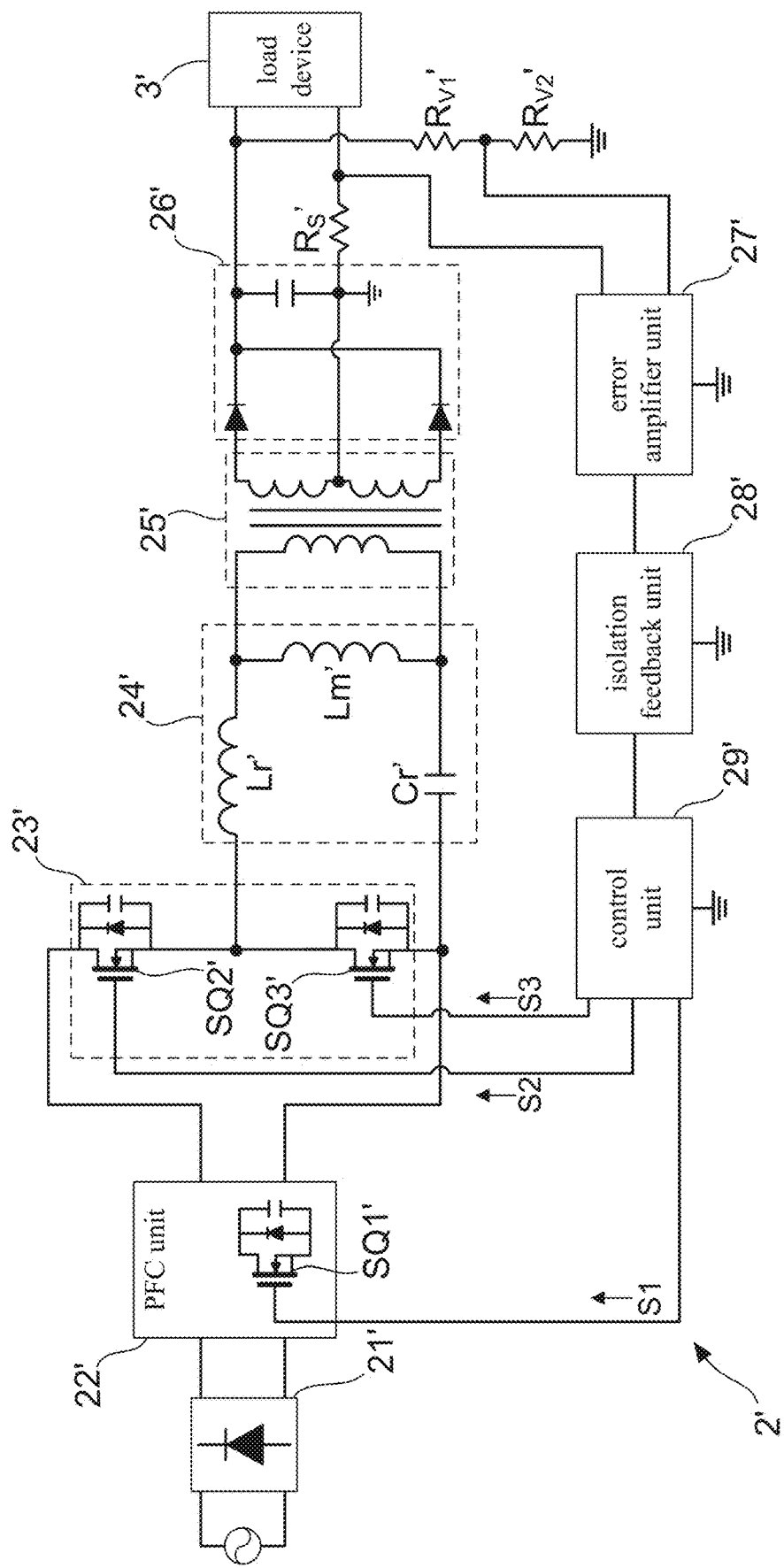
FIG. 1 shows a diagram for diagram for describing a circuit topology of a conventional LLC resonant converter.
Figure 2:
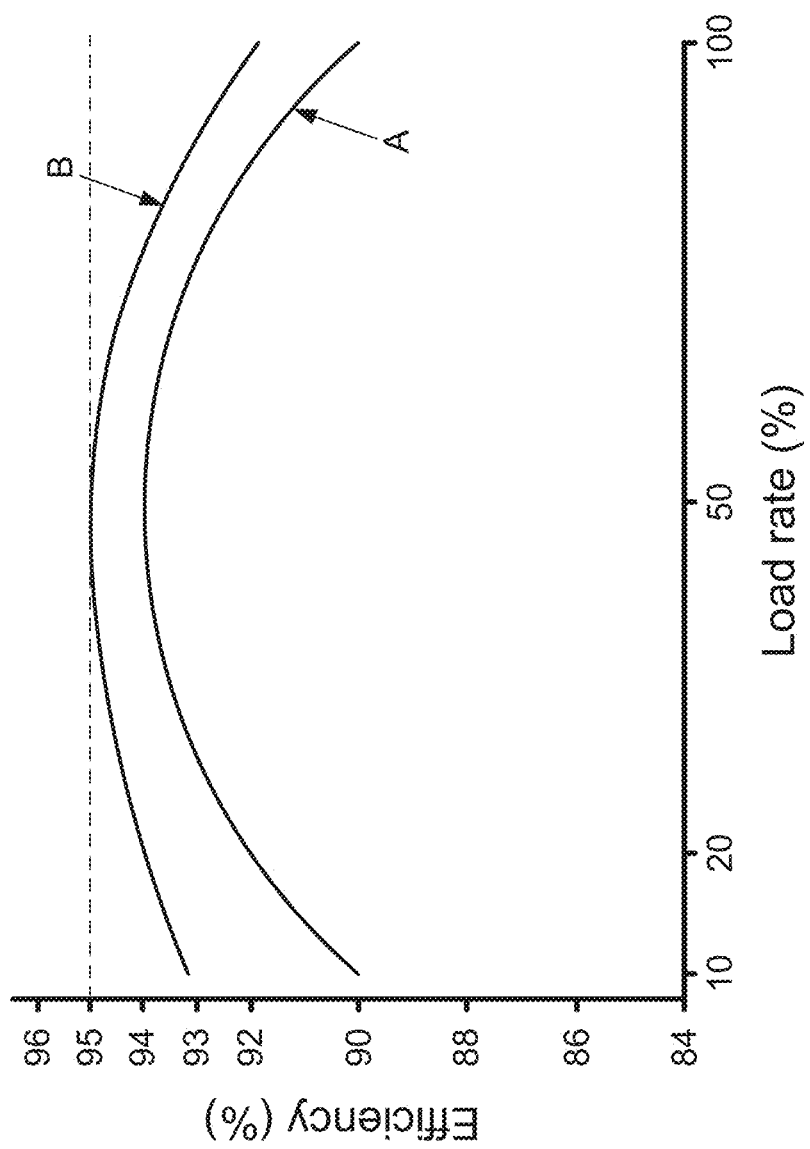
FIG. 2 shows a curve graph of load rate versus conversion efficiency of the conventional LLC resonant converter.

In the curve graph of FIG. 6, data of curve C is measured as a 230 Vac power signal is inputted to this novel LLC resonant converter 1, and data of curve B is measured as a 230 Vac power signal is inputted to the conventional LLC resonant converter 2' (shown in FIG. 1). From the measured data, it is understood that, the LLC resonant converter 1 of the present invention is controlled, by modulating the output voltage (i.e., the first voltage signal V1) of the PFC unit 12, to exhibit a conversion efficiency of at least 98% in case of working at any one load state.

Moreover, FIG. 3 and FIG. 4 depict that the LLC resonant converter 1 further comprises: a voltage detection unit and a second isolation feedback unit 18b. The voltage detection unit voltage divider consisting of a first resistor Rv1 and a second resistor Rv2, and is coupled the second electrical terminal of the secondary winding. On the other hand, the second isolation feedback unit 18b is coupled to the first control unit 17, and is also coupled to the control signal receiving terminal of the second switch element SQ2 and the control signal receiving terminal of the third switch element SQ3. Moreover, the control signal receiving terminal of the fourth switch element SQ4 and the control signal receiving terminal of the fifth switch element SQ5 are both coupled to the first control unit 17. By such arrangement, the second control unit 17 generates a second adjustment signal Smd2 after acquiring a voltage signal sampling data from the voltage detection unit, such that the control signal receiving terminal of the second switch element SQ2 and the control signal receiving terminal of the third switch element SQ3 receive a second switch element controlling signal S2 and a third switch element controlling signal S3 from the second isolation feedback unit 18b.

First Embodiment

Figure 7:
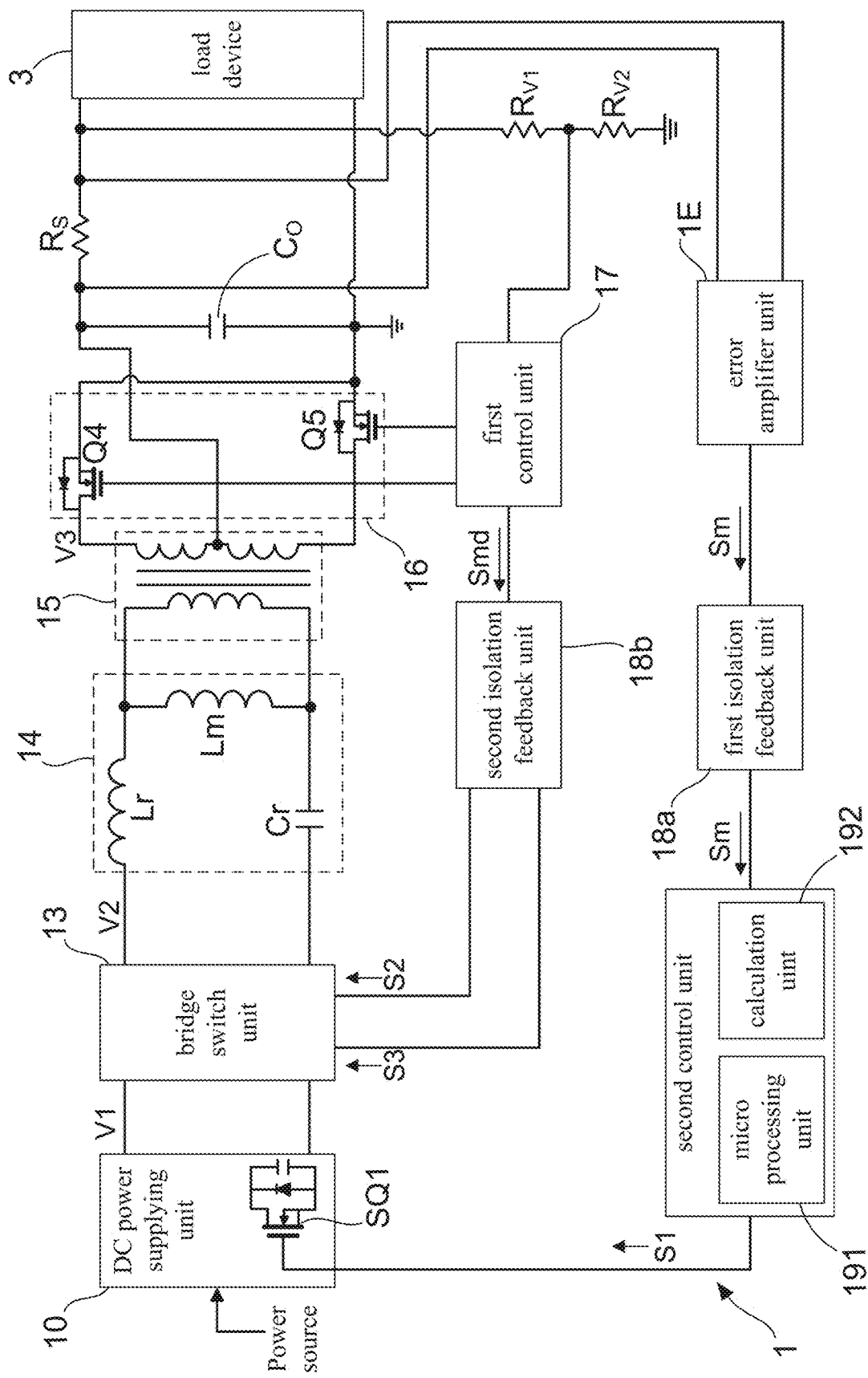
FIG. 7 shows a block diagram of a high-efficiency LLC resonant converter according to the present invention.

With reference to FIG. 7, there is shown a block diagram of a high-efficiency LLC resonant converter according to the present invention. As FIG. 7 shows, in second embodiment, the high-efficiency LLC resonant converter 1 comprises: a DC power supplying unit 10, a bridge switch unit 13, a resonant unit 14, a transformer unit 15, an output rectifying unit 16, a detection unit Rs, a first control unit 17, an error amplifier unit 1E, a first isolation feedback unit 18a, and a second control unit 19.

The DC power supplying unit 10 has at least one first switch element SQ1, and is configured for receiving a power signal, thereby outputting a first voltage signal V1 after applying a power conversion process to the power signal. Moreover, the bridge switch unit 13 is coupled to the DC power supplying unit 10 for receiving the first voltage signal V1, and the resonant unit 14 comprises a resonant inductor Lr and a resonant capacitor Cr, and is coupled to a second voltage signal that is transmitted from the bridge switch unit 13. As described in more detail below, the transformer unit 15 comprises a primary winding, a magnetizing inductor Lm that is parallelly connected to the primary winding, and a secondary winding having a first electrical terminal, a second electrical terminal and a third electrical terminal, wherein the primary winding is coupled to the resonant unit 14, such that the magnetizing inductor Lm, the resonant inductor Lr and the resonant capacitor Cr together form an LLC resonant tank. Moreover, the output rectifying unit 16 is coupled to the first electrical terminal and the third electrical terminal of the secondary winding, thereby outputting an output voltage signal to at least one load device 3 after applying a signal rectifying process to a third voltage signal V3 received from the secondary winding.

In second embodiment, the detection unit Rs is coupled to the second electrical terminal of the secondary winding, the first control unit 17 is coupled to the output rectifying unit 16, and the error amplifier unit 1E is coupled to the two end terminals of the detection unit Rs, so as to correspondingly generate a modulated voltage signal Sm after receiving a voltage difference from the two terminal ends of the detection unit Rs. Moreover, the first isolation feedback unit 18a is coupled to the error amplifier unit 1E, and the second control unit 19 is coupled to the first isolation feedback unit 18a. It is worth noting that, the second control unit 19 is also coupled to the modulated voltage signal Sm via the first isolation feedback unit 18a. By such arrangement, the second control unit 19 calculates an immediate load rate based on the modulated voltage signal Sm, and correspondingly generating a first switch element controlling signal S1, based on the calculated immediate load rate, transmitted to a control signal receiving terminal of the switch element SQ1 of the DC power supplying unit 10, such that an output voltage modulation of the DC power supplying unit 10 is achieved by using the first switch element controlling signal S1 to control a switching frequency of the first switch element SQ1, thereby keeping a conversion efficiency of the LLC resonant converter be greater than 98%.

From FIG. 7, it is found that the second control unit 19 comprises a calculation unit 192 and a micro processing unit 191. In which, the calculation unit 192 is configured for calculating the immediate load rate based on the modulated voltage signal Sm, and the micro processing unit 191 is coupled to the calculation unit 192, so as to generate the first switch element controlling signal S1 based on the calculated immediate load rate. In one practicable embodiment, the calculation unit 192 is implemented into the second control unit 19 by a form of mathematical algorithm.

In another one practicable embodiment, the calculation unit 192 can be a Look-up table (LUT) recording with a plurality of voltage values of the modulated voltage signal Sm that is generated by the error amplifier unit 1E, a plurality of load rates that are respectively corresponding to the plurality of voltage values, and a plurality of modulation parameters that are respectively corresponding to the plurality of load rates. For example, it is able to set the modulated voltage signal Sm has a voltage value varies in a range from 0V and 2.0V. As explained in more detail below, when the LLC resonant converter 1 is operated at a no load state (i.e. load rate=0%), the voltage value of the modulated voltage signal Sm is set to be 0V. On the contrary, when the LLC resonant converter 1 is operated at a full load state (i.e. load rate=0%), the voltage value of the modulated voltage signal Sm is set to be 2.0V. As such, it should be understood that a load rate monitoring resolution of the LLC resonant converter 1 can be set to N, and N is decided by a formula of (2−0)/M. M is a voltage changing value. From example, if the voltage values of the modulated voltage signal Sm recorded in the LUT (i.e., the calculation unit 172) are 0V, 0.02V, ... , 1V, 1.02V, ... , 1.98V, and 2V, the forgoing voltage changing value M is 0.02. Accordingly, the plurality of load rates, respectively corresponding to the plurality of voltage values, are 1%, 2%, ... , 50%, 51%, ... , 99%, 100%.

Briefly speaking, during a normal operation of the LLC resonant converter 1, the error amplifier unit 1E generates a modulated voltage signal Sm to the second control unit 19 after receives a data of voltage difference from a detection unit Rs, and then the second control unit 19 calculates an immediate load rate based on the modulated voltage signal Sm. Subsequently, the second control unit 19 correspondingly generates a first switch element controlling signal S1, based on the calculated immediate load rate, transmitted to a control signal receiving terminal of the switch element SQ1 of the DC power supplying unit 10, such that an output voltage modulation of the DC power supplying unit 10 is achieved by using the first switch element controlling signal S1 to control a switching frequency of the first switch element SQL As such, the LLC resonant converter 1 is controlled to exhibit a conversion efficiency of at least 98% in case of working at any one load state.

Moreover, FIG. 7 depict that the second embodiment of the LLC resonant converter 1 further comprises: a voltage detection unit and a second isolation feedback unit 18b. The voltage detection unit voltage divider consisting of a first resistor Rv1 and a second resistor Rv2, and is coupled the second electrical terminal of the secondary winding. On the other hand, the second isolation feedback unit 18b is coupled to the first control unit 17, and is also coupled to the control signal receiving terminal of the second switch element SQ2 and the control signal receiving terminal of the third switch element SQ3. By such arrangement, the second control unit 17 generates an adjustment signal Smd after acquiring a voltage signal sampling data from the voltage detection unit, such that the control signal receiving terminal of the second switch element SQ2 and the control signal receiving terminal of the third switch element SQ3 receive a second switch element controlling signal S2 and a third switch element controlling signal S3 from the second isolation feedback unit 18b.

The above description is made on embodiments of the present invention. However, the embodiments are not intended to limit scope of the present invention, and all equivalent implementations or alterations within the spirit of the present invention still fall within the scope of the present invention.

What is claimed is:

1. An LLC resonant converter, comprising:
a DC power supplying unit, having at least one first switch element, and being configured for receiving a power signal, thereby outputting a first voltage signal after applying a power conversion process to the power signal;
a bridge switch unit, being coupled to the DC power supplying unit for receiving the first voltage signal;
a resonant unit, comprising a resonant inductor and a resonant capacitor, and being coupled to a second voltage signal that is transmitted from the bridge switch unit;
a transformer unit, comprising a primary winding, a magnetizing inductor that is parallelly connected to the primary winding, and a secondary winding having a first electrical terminal, a second electrical terminal and a third electrical terminal, wherein the primary winding is coupled to the resonant unit, such that the magnetizing inductor, the resonant inductor and the resonant capacitor together form an LLC resonant tank;
an output rectifying unit, being coupled to the first electrical terminal and the third electrical terminal of the secondary winding, thereby outputting an output voltage signal to at least one load device after applying a signal rectifying process to a third voltage signal received from the secondary winding;
a detection unit, being coupled to the second electrical terminal of the secondary winding, and having two end terminals;
a first control unit, being coupled to the output rectifying unit;
an error amplifier unit, being coupled to the two end terminals of the detection unit, and being also coupled to the first control unit; wherein the error amplifier unit receives a voltage difference from the two terminal ends of the detection unit, so as to correspondingly generate a modulated voltage signal to the first control unit, such that the first control unit generates a first adjustment signal after calculating an immediate load rate based on the modulated voltage signal;
a first isolation feedback unit, being coupled to the first control unit; and
a second control unit, being coupled to the first isolation feedback unit, and being also coupled to the first adjustment signal via the first isolation feedback unit, so as to correspondingly generate a first switch element controlling signal transmitted to a control signal receiving terminal of the switch element of the DC power supplying unit, such that an output voltage modulation of the DC power supplying unit is achieved, thereby keeping a conversion efficiency of the LLC resonant converter to be greater than a specific value.

2. The LLC resonant converter of claim 1, wherein the DC power supplying unit is an AC-to-DC power converter or a DC-to-DC converter.

3. The LLC resonant converter of claim 1, wherein the DC power supplying unit is a boost DC-to-DC converter, and comprising:
- a full-bridge rectifying unit, being coupled to the power signal, so as to convert the power signal to a pulsating DC signal; and
- a PFC unit comprising the at least one first switch element, being coupled to the full-bridge rectifying unit.

4. The LLC resonant converter of claim 3, wherein the PFC unit is selected from a group consisting of a semi-bridgeless PFC unit, an interleaving PFC unit, a totem pole PFC, and a regular PFC unit.

5. The LLC resonant converter of claim 3, wherein the bridge switch unit is a half-bridge switch unit, and comprising:
- a second switch element having a first electrical terminal, a second electrical terminal and a control signal receiving terminal, wherein the PFC unit of the DC power supplying unit is coupled to the first electrical terminal of the second switch element, and the resonant unit being coupled to the second electrical terminal of the second switch element; and
- a third switch element having a first electrical terminal, a second electrical terminal and a control signal receiving electrical terminal, wherein the PFC unit of the DC power supplying unit is coupled to the second electrical terminal of the third switch element, and the resonant unit being coupled to the first electrical terminal of the third switch element.

6. The LLC resonant converter of claim 5, further comprising:
- a voltage detection unit, being coupled the second electrical terminal of the secondary winding; and
- a second isolation feedback unit, being coupled to the first control unit, and being also coupled to the control signal receiving terminal of the second switch element and the control signal receiving terminal of the third switch element;
- wherein the second control unit generates a second adjustment signal after acquiring a voltage signal sampling data from the voltage detection unit, such that the control signal receiving terminal of the second switch element and the control signal receiving terminal of the third switch element receive a second switch element controlling signal and a third switch element controlling signal from the second isolation feedback unit.

7. The LLC resonant converter of claim 5, wherein the output rectifying unit is a synchronous rectifier (SR) unit, and comprising:
- a fourth switch element having a first electrical terminal, a second electrical terminal and a control signal receiving terminal, wherein the first electrical terminal of the secondary winding is coupled to the first electrical terminal of the fourth switch element, and the third electrical terminal of the secondary winding being coupled to the second electrical terminal of the fourth switch element; and
- a fifth switch element having a first electrical terminal, a second electrical terminal and a control signal receiving electrical terminal, wherein the third electrical terminal of the secondary winding is coupled to the first electrical terminal of the fifth switch element, and the load device being coupled to the second electrical terminal of the fifth switch element;
- wherein the control signal receiving terminal of the fourth switch element and the control signal receiving terminal of the fifth switch element are both coupled to the first control unit.

8. The LLC resonant converter of claim 7, wherein each of the first switch element, the second switch element, the third switch element, the fourth switch element, and the fifth switch element is selected from group consisting of a power MOSFET, a GaN MOSFET and an insulated gate bipolar transistor (IGBT).

9. The LLC resonant converter of claim 1, wherein the bridge switch unit is selected from a group consisting of a full-bridge switch unit and a half-bridge switch.

10. The LLC resonant converter of claim 1, wherein the first control unit comprises:
- a calculation unit, being configured for calculating the immediate load rate based on the modulated voltage signal; and
- a micro processing unit, being coupled to the calculation unit, thereby generating the first adjustment signal based on the calculated immediate load rate.

11. An LLC resonant converter, comprising:
- a DC power supplying unit, having at least one first switch element, and being configured for receiving a power signal, thereby outputting a first voltage signal after applying a power conversion process to the power signal;
- a bridge switch unit, being coupled to the DC power supplying unit for receiving the first voltage signal;
- a resonant unit, comprising a resonant inductor and a resonant capacitor, and being coupled to a second voltage signal that is transmitted from the bridge switch unit;
- a transformer unit, comprising a primary winding, a magnetizing inductor that is parallelly connected to the primary winding, and a secondary winding having a first electrical terminal, a second electrical terminal and a third electrical terminal, wherein the primary winding is coupled to the resonant unit, such that the magnetizing inductor, the resonant inductor and the resonant capacitor together form an LLC resonant tank;
- an output rectifying unit, being coupled to the first electrical terminal and the third electrical terminal of the secondary winding, thereby outputting an output voltage signal to at least one load device after applying a signal rectifying process to a third voltage signal received from the secondary winding;
- a detection unit, being coupled to the second electrical terminal of the secondary winding, and having two end terminals;
- a first control unit, being coupled to the output rectifying unit;
- an error amplifier unit, being coupled to the two end terminals of the detection unit, so as to correspondingly generate a modulated voltage signal after receiving a voltage difference from two terminal ends of the detection unit;
- a first isolation feedback unit, being coupled to the error amplifier unit; and
- a second control unit, being coupled to the first isolation feedback unit, and being also coupled to the modulated voltage signal via the first isolation feedback unit;
- wherein the second control unit calculates an immediate load rate based on the modulated voltage signal, and correspondingly generating a first switch element controlling signal, based on the calculated immediate load rate, transmitted to a control signal receiving terminal of the switch element of the DC power supplying unit, such that an output voltage modulation of the DC power supplying unit is achieved by using the first switch element controlling signal to control a switching frequency of the first switch element, thereby keeping a conversion efficiency of the LLC resonant converter to be greater than a specific value.

12. The LLC resonant converter of claim 11, wherein the DC power supplying unit is an AC-to-DC power converter or a DC-to-DC converter.

13. The LLC resonant converter of claim 11, wherein the DC power supplying unit is a boost DC-to-DC converter, and comprising:
- a full-bridge rectifying unit, being coupled to the power signal, so as to convert the power signal to a pulsating DC signal; and
- a PFC unit comprising the at least one first switch element, being coupled to the full-bridge rectifying unit.

14. The LLC resonant converter of claim 13, wherein the PFC unit is selected from a group consisting of a semi-bridgeless PFC unit, an interleaving PFC unit, a totem pole PFC, and a regular PFC unit.

15. The LLC resonant converter of claim 13, wherein the bridge switch unit is a half-bridge switch unit, and comprising:
- a second switch element having a first electrical terminal, a second electrical terminal and a control signal receiving terminal, wherein the PFC unit of the DC power supplying unit is coupled to the first electrical terminal of the second switch element, and the resonant unit being coupled to the second electrical terminal of the second switch element; and
- a third switch element having a first electrical terminal, a second electrical terminal and a control signal receiving electrical terminal, wherein the PFC unit of the DC power supplying unit is coupled to the second electrical terminal of the third switch element, and the resonant unit being coupled to the first electrical terminal of the third switch element.

16. The LLC resonant converter of claim 15, further comprising:
- a voltage detection unit, being coupled the second electrical terminal of the secondary winding; and
- a second isolation feedback unit, being coupled to the first control unit, and being also coupled to the control signal receiving terminal of the second switch element and the control signal receiving terminal of the third switch element;

wherein the second control unit generates an adjustment signal after acquiring a voltage signal sampling data from the voltage detection unit, such that the control signal receiving terminal of the second switch element and the control signal receiving terminal of the third switch element receive a second switch element controlling signal and a third switch element controlling signal from the second isolation feedback unit.

17. The LLC resonant converter of claim 15, wherein the output rectifying unit is a synchronous rectifier (SR) unit, and comprising:
- a fourth switch element having a first electrical terminal, a second electrical terminal and a control signal receiving terminal, wherein the first electrical terminal of the secondary winding is coupled to the first electrical terminal of the fourth switch element, and the third electrical terminal of the secondary winding being coupled to the second electrical terminal of the fourth switch element; and
- a fifth switch element having a first electrical terminal, a second electrical terminal and a control signal receiving electrical terminal, wherein the third electrical terminal of the secondary winding is coupled to the first electrical terminal of the fifth switch element, and the load device being coupled to the second electrical terminal of the fifth switch element;

wherein the control signal receiving terminal of the fourth switch element and the control signal receiving terminal of the fifth switch element are both coupled to the first control unit.

18. The LLC resonant converter of claim 17, wherein each of the first switch element, the second switch element, the third switch element, the fourth switch element, and the fifth switch element is selected from a group consisting of power MOSFET, a GaN MOSFET and an insulated gate bipolar transistor (IGBT).

19. The LLC resonant converter of claim 11, wherein the bridge switch unit is selected from a group consisting of a full-bridge switch unit and a half-bridge switch.

20. The LLC resonant converter of claim 11, wherein the second control unit 19 comprises:
- a calculation unit, being configured for calculating the immediate load rate based on the modulated voltage signal; and
- a micro processing unit, being coupled to the calculation unit, thereby generating the first switch element controlling signal based on the calculated immediate load rate.

* * * * *